(12) United States Patent
Rubin

(10) Patent No.: US 9,258,319 B1
(45) Date of Patent: Feb. 9, 2016

(54) DETECTION OF AND RESPONSES TO NETWORK ATTACKS

(71) Applicant: Amazon Technologies, Inc., Reno, NV (US)

(72) Inventor: Gregory A. Rubin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/930,507

(22) Filed: Jun. 28, 2013

Related U.S. Application Data

(63) Continuation of application No. 12/980,057, filed on Dec. 28, 2010, now Pat. No. 8,499,348.

(51) Int. Cl.
    *G06F 7/04* (2006.01)
    *H04L 29/06* (2006.01)

(52) U.S. Cl.
    CPC .................................. *H04L 63/1416* (2013.01)

(58) Field of Classification Search
    CPC .... H04L 63/00; H04L 63/0218; G06F 21/554
    USPC ........... 726/11, 22–26; 709/223–238; 706/46; 713/150
    See application file for complete search history.

(56) References Cited

U.S. PATENT DOCUMENTS

| | | | |
|---|---|---|---|
| 6,735,702 B1 * | 5/2004 | Yavatkar et al. ................. | 726/13 |
| 7,305,704 B2 * | 12/2007 | Ofek et al. ....................... | 726/15 |
| 7,325,252 B2 * | 1/2008 | Bunker et al. ................... | 726/25 |
| 7,367,054 B2 * | 4/2008 | Soppera .............. H04L 63/0823 | 713/153 |
| 7,539,857 B2 | 5/2009 | Bartlett et al. | |
| 7,596,807 B2 * | 9/2009 | Ptacek et al. .................... | 726/11 |
| 7,640,338 B2 * | 12/2009 | Huitema ................ H04L 63/14 | 709/224 |
| 7,707,305 B2 * | 4/2010 | Afek et al. ..................... | 709/238 |
| 7,779,119 B2 * | 8/2010 | Ginter et al. .................. | 709/224 |
| 7,787,458 B2 * | 8/2010 | Dubuc et al. .................. | 370/392 |
| 7,853,998 B2 | 12/2010 | Blaisdell et al. | |
| 8,104,077 B1 | 1/2012 | Gauvin et al. | |
| 8,166,554 B2 * | 4/2012 | John ............................... | 726/26 |
| 8,225,408 B2 | 7/2012 | Rubin et al. | |
| 8,239,951 B2 * | 8/2012 | Lotem ................. H04L 63/1433 | 703/13 |
| 8,250,666 B2 | 8/2012 | Karabulut et al. | |
| 8,266,267 B1 * | 9/2012 | Guruswamy et al. ......... | 709/223 |
| 8,266,696 B2 * | 9/2012 | O'Rourke ........... H04L 63/0227 | 726/23 |

(Continued)

OTHER PUBLICATIONS

K Sanzgiri, Secure routing protocol for ad hoc networks, Nov. 2002, IEEE, vol. 10, pp. 78-87.*

(Continued)

*Primary Examiner* — Dede Zecher
*Assistant Examiner* — Viral Lakhia
(74) *Attorney, Agent, or Firm* — Thomas | Horstemeyer, LLP

(57) ABSTRACT

Disclosed are various embodiments for detecting and responding to attacks on a computer network. One embodiment of such a method describes monitoring data communications transmitted to a target class of first computing nodes; in response to detecting a non-legitimate data communication to a computing node in the target class, determining whether the non-legitimate data communication is a form of attack on a network to which the computing nodes are connected; and in response to determining that the network is under attack, implementing new security measures for second computing nodes that are not part of the target class to protect the second computing nodes against the attack on the network while the attack is ongoing.

18 Claims, 7 Drawing Sheets

(56) References Cited

U.S. PATENT DOCUMENTS

| | | | |
|---|---|---|---|
| 8,286,239 B1 | 10/2012 | Sutton | |
| 8,307,440 B1 | 11/2012 | Canion et al. | |
| 8,346,960 B2 | 1/2013 | Spatscheck et al. | |
| 8,407,798 B1 * | 3/2013 | Lotem | G06F 21/55 726/18 |
| 8,499,348 B1 * | 7/2013 | Rubin | 726/22 |
| 8,631,484 B2 * | 1/2014 | Stavrou | H04L 63/1458 713/153 |
| 8,752,173 B2 * | 6/2014 | Yadav | 726/23 |
| 8,769,697 B2 * | 7/2014 | McGinley | G06F 21/00 726/22 |
| 8,844,035 B2 * | 9/2014 | O'Rourke | H04L 63/0227 726/23 |
| 2007/0011741 A1 | 1/2007 | Robert et al. | |
| 2007/0094491 A1 | 4/2007 | Teo et al. | |
| 2007/0157312 A1 * | 7/2007 | Joubert et al. | 726/22 |
| 2008/0271141 A1 * | 10/2008 | Goldman et al. | 726/22 |
| 2009/0034557 A1 * | 2/2009 | Fluhrer et al. | 370/474 |
| 2009/0100520 A1 | 4/2009 | Reasor et al. | |
| 2009/0328219 A1 | 12/2009 | Narayanaswamy | |
| 2010/0082513 A1 * | 4/2010 | Liu | 706/46 |
| 2010/0095367 A1 * | 4/2010 | Narayanaswamy | 726/12 |
| 2010/0318645 A1 | 12/2010 | Hoole et al. | |
| 2011/0072506 A1 * | 3/2011 | Law et al. | 726/11 |
| 2011/0099365 A1 * | 4/2011 | Dhawan | 713/150 |
| 2011/0276699 A1 * | 11/2011 | Pedersen | 709/227 |
| 2012/0036362 A1 * | 2/2012 | Agrawal et al. | 713/171 |
| 2013/0312101 A1 * | 11/2013 | Lotem | G06F 21/55 726/25 |
| 2014/0101746 A1 * | 4/2014 | Stavrou | H04L 63/1458 726/9 |
| 2014/0298473 A1 * | 10/2014 | McGinley | G06F 21/00 726/25 |
| 2015/0033340 A1 * | 1/2015 | Giokas | H04L 63/1433 726/23 |

OTHER PUBLICATIONS

Andre Gregio, Evaluation of Data Mining Techniques for Suspicious Network Activity, Jun. 2007, Proc. of SPIE, vol. 6570, pp. 1-10.

* cited by examiner

FIG. 4A

| NODE | GROUP  |     |
|------|--------|-----|
| A    | GROUP1 | ... |
| B    | GROUP2 | ... |
| C    | GROUP2 | ... |
| D    | GROUP3 | ... |
| D    | GROUP4 | ... |
| ...  | ...    | ... |

FIG. 4B

| GROUP NAME | ALLOWED SENDER | HTTP | FTP | SMTP |     |
|------------|----------------|------|-----|------|-----|
| GROUP1     | 0.0.0.0/0      | YES  | NO  | NO   |     |
| GROUP2     | GROUP1         | YES  | NO  | NO   |     |
| GROUP2     | GROUP3         | YES  | NO  | YES  |     |
| GROUP2     | 192.25.1.23    | YES  | YES | YES  |     |
| GROUP3     | GROUP2         | YES  | NO  | NO   |     |
| GROUP3     | 196.25.1.23    | YES  | YES | YES  |     |
| ...        |                |      |     |      |     |

FIG. 7A

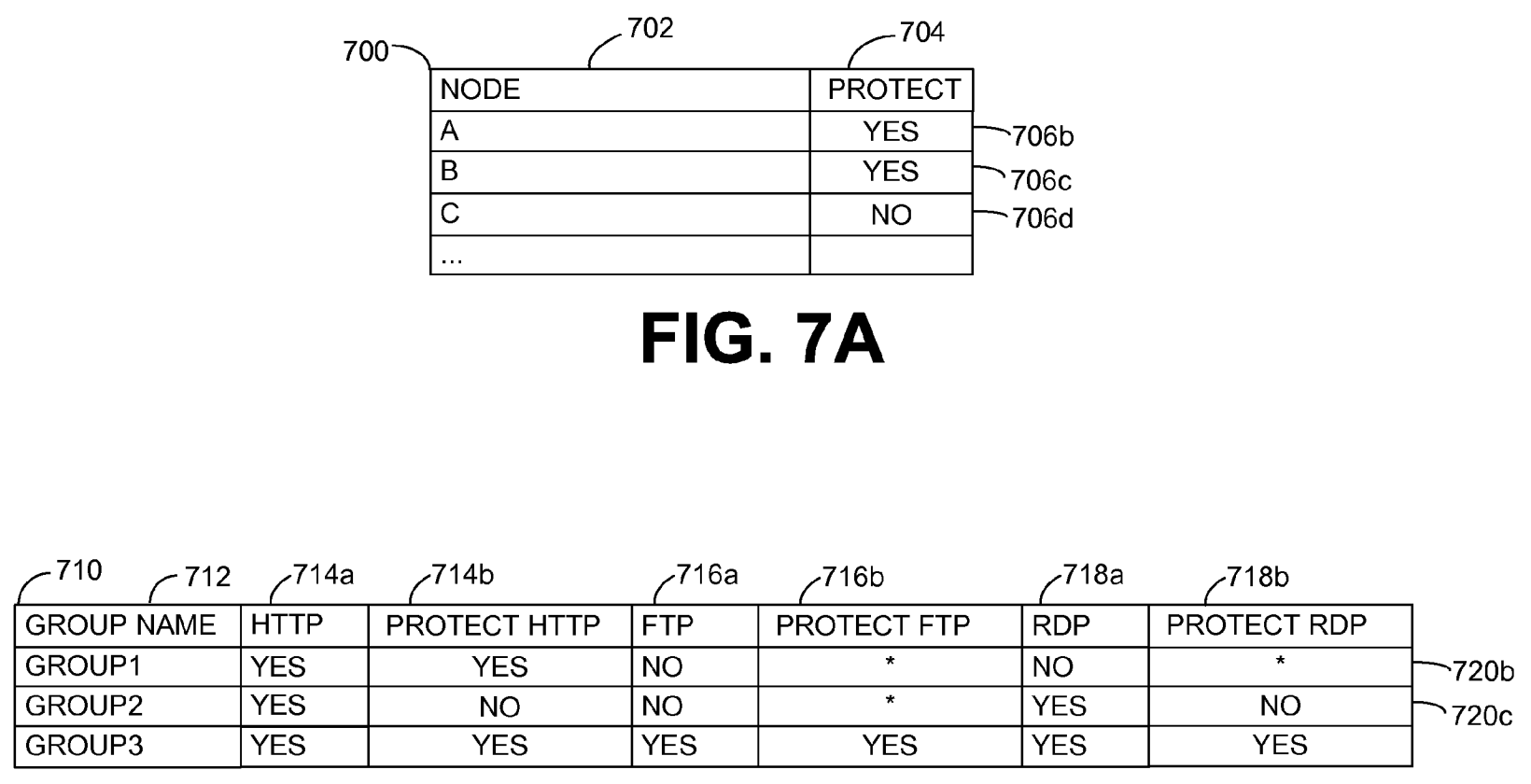

| NODE | PROTECT |
|------|---------|
| A | YES |
| B | YES |
| C | NO |
| ... | |

FIG. 7B

| GROUP NAME | HTTP | PROTECT HTTP | FTP | PROTECT FTP | RDP | PROTECT RDP |
|------------|------|--------------|-----|-------------|-----|-------------|
| GROUP1 | YES | YES | NO | * | NO | * |
| GROUP2 | YES | NO | NO | * | YES | NO |
| GROUP3 | YES | YES | YES | YES | YES | YES |

DETECTION OF AND RESPONSES TO NETWORK ATTACKS

CROSS-REFERENCE TO RELATED APPLICATION

This application is a continuation of copending U.S. utility application entitled, "Detection of and Responses to Network Attacks," having Ser. No. 12/980,057, filed Dec. 28, 2010, which is entirely incorporated herein by reference.

BACKGROUND

One problem that arises in the context of data centers that virtually or physically host large numbers of applications or systems for a set of diverse customers involves providing network isolation for the systems operated by or on behalf of each customer, so as to allow communications between those systems (if desired by the customer) while restricting undesired communications to those systems from other systems.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 4A-4B illustrate examples of using group membership information for managing communications between computing nodes according to various embodiments of the present disclosure.

FIGS. 7A-7B illustrate examples of authorizing dynamic changes to be made to a customer's access rights according to various embodiments of the present disclosure.

DETAILED DESCRIPTION

Techniques are described for dynamically updating access policies for computing nodes on a network upon discovering attacks on the network. In some embodiments, the computing nodes include virtual machine nodes that are hosted on one or more physical computing machines or systems, and the communications include transmissions of data (e.g., messages, data packets or frames, etc.) between nodes hosted on the same physical machine or distinct physical machines over one or more networks.

Figure 1:
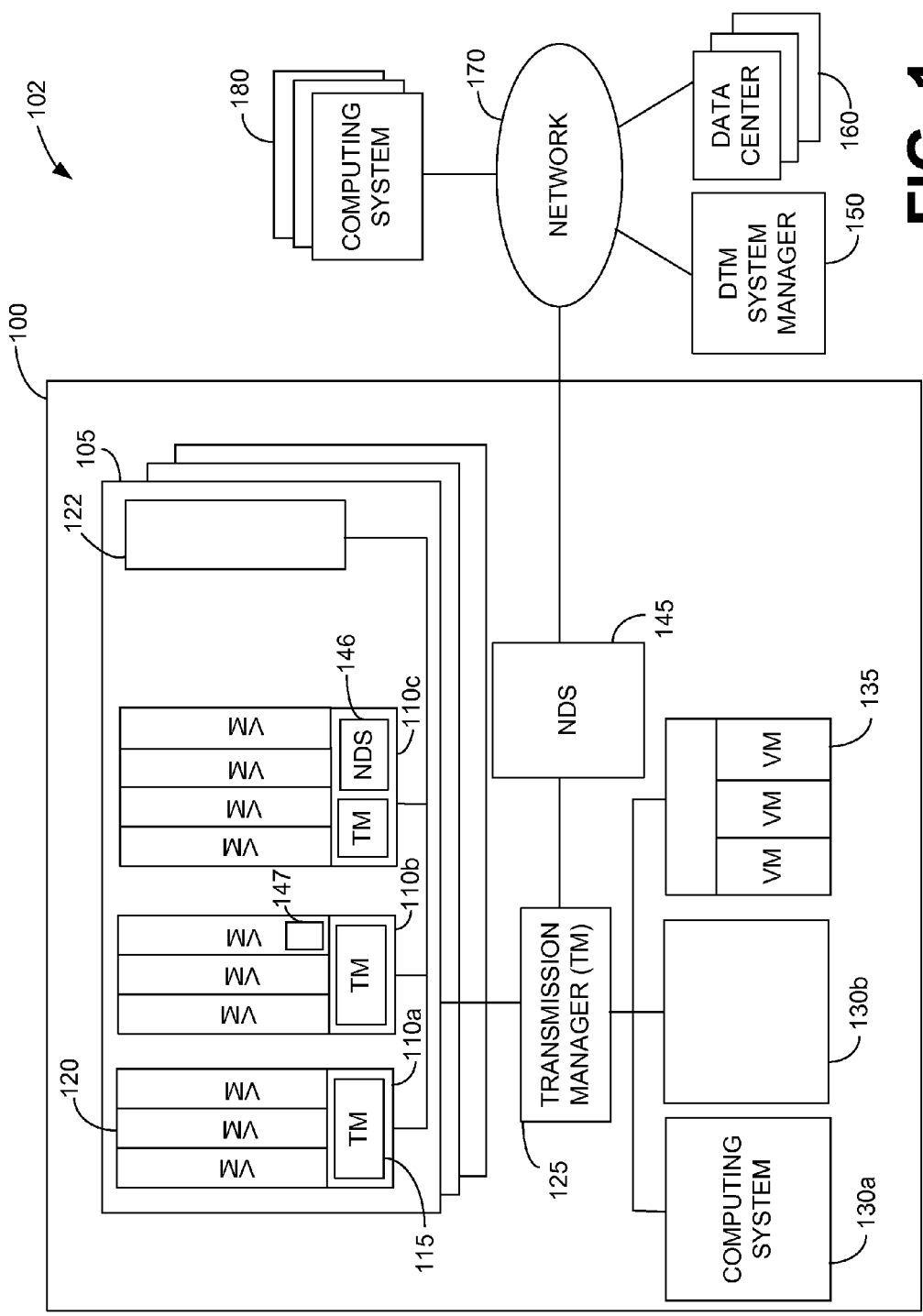
FIG. 1 is a drawing of a Data Transmission Management system according to various embodiments of the present disclosure.

FIG. 1 is a network diagram illustrating an example embodiment in which multiple Transmission Manager ("TM") components manage communications between computing nodes, with the multiple TM components being part of a Data Transmission Management ("DTM") system 102 managing the data transmissions of various computing nodes located within a data center 100. In this example, data center 100 comprises a number of racks 105, which each include a number of physical computing systems 110a-c and a rack support computing system 122. The computing systems 110a-c each provide one or more virtual machine nodes 120, which each may be employed to provide an independent computing environment to host applications within the data center 100. In addition, the computing systems 110a-c each host a TM component node 115 that manages outgoing data transmissions from virtual machine nodes 120 hosted on the computing system, as well as incoming data transmissions from other nodes (whether local or remote to the data center 100) to those hosted virtual machine nodes on the computing system. In this example embodiment, the rack support computing system 122 provides utility services for computing systems local to the rack (e.g., data storage services, network proxies, application monitoring and administration, etc.), as well as possibly other computing systems located in the data center, although in other embodiments such rack support computing systems may not be used. The computing systems 110a-c and the rack support computing system 122 of a rack in this example all share a common, high-speed, rack-level network interconnect (e.g., via a shared backplane, one or more hubs and/or switches that are physically local or remote to the particular rack, etc.), not shown.

In addition, in at least some embodiments, the management of data transmissions includes analyzing outgoing data transmissions that are requested or otherwise initiated from a source node to one or more destination nodes in order to determine whether the data transmissions are authorized, such as under control of a TM component 125 associated with the source node, and with the data transmissions being allowed to continue over one or more networks to the destination node(s) only if authorization is determined to exist. The determination of authorization by the TM component 125 may, for example, be based at least in part on defined data transmission policies that specify groups of one or more source nodes that are authorized to communicate with groups of one or more destination nodes, such as when a source node and destination node both belong to a common group of nodes.

In addition, the example data center 100 further comprises additional computing systems 130a-b and 135 that are not located on a rack, but share a common network interconnect to a TM component 125 associated with those additional computing systems, although in other embodiments such additional non-rack computing systems may not be present. In this example, computing system 135 also hosts a number of virtual machine nodes, while computing systems 130a-b instead act as a single physical machine node. The TM component 125 similarly manages incoming and outgoing data transmissions for the associated virtual machine nodes hosted on computing system 135 and for computing system nodes 130a-b. An optional DTM Group Manager component (not shown) may provide a number of services to TM components local to the data center 100, such as to maintain global state information for the TM components (e.g., group membership information, access policies, etc.).

In some embodiments, an application execution service executes third-party customers' applications using multiple physical machines (e.g., in one or more data centers) that each host multiple virtual machines or nodes 120 (which are each able to execute one or more applications for a customer), and the described techniques may be used by one or more data transmission management systems executing as part of the application execution service to control communications to and from the applications of each customer. Customers may provide applications for execution to the execution service and may reserve execution time and other resources on physical or virtual hardware facilities provided by the execution service. In addition, customers may create new groups of computing nodes (e.g., multiple computing nodes that are currently each executing one of multiple instances of a program of the customer) and specify access policies for the groups. When specifying access policies, customers may have the membership of the groups and/or the specified access policies be updated (whether automatically or manually) to reflect changing conditions, such as detection of possible network vulnerabilities and to reflect new application instances that are executed, previously executing application instances that are no longer executing, and/or new or adjusted access policies (e.g., to reflect new security requirements, such as by changing whether access to other computing nodes, groups and/or applications is allowed or denied, possibly in response to an attack on a network or computing nodes).

In some embodiments, access policies describe source nodes (also referred to as "sending nodes" or "senders") that are allowed to transmit data to a particular destination node or group of nodes, such as by describing such source nodes individually (e.g., via network address or other identifier), via ranges of network addresses or other identifiers, as one or more groups of related source nodes, etc., while in other embodiments access policies may instead, in a similar manner, describe destination nodes that are allowed to receive data transmissions from one or more particular source nodes or groups of nodes. In the absence of specified access policies and/or the ability to determine that a particular initiated data transmission is authorized, some embodiments may provide default access policies and/or authorization polices, such as to deny all data transmissions unless determined to be authorized, or instead to allow all data transmissions unless determined to not be authorized.

In one example embodiment, multiple transmission manager components (TM) 115, 125 of a Data Transmission Management ("DTM") system 102 work together to manage the data transmissions of a number of intercommunicating participant computing nodes. Initially, when a participant computing node comes online, a TM component 125 associated with the participant node determines the node's network address (e.g., Internet Protocol (IP) address) or other network location, any groups to which the node belongs, and indications of source nodes that are authorized to transmit data to the node. Later, when the participant node attempts to initiate communication with a remote destination node, the associated TM 125 component detects the initiated communication, and determines whether authorization for the communication already exists based on obtained authorization for a prior communication from the participant source node to the destination node. If existing authorization is not available, the associated TM component 125 attempts to negotiate authorization to communicate with the remote destination node, such as by communicating with a remote TM component 115 associated with the remote destination node (e.g., by sending a negotiation request that triggers the negotiation)—a negotiation request for a data transmission from a participant source node to a destination node may contain information related to the network identity and group membership of the participant source node.

After the remote TM component 115 associated with the remote destination node receives a negotiation request on behalf of a source node, the component determines whether the source node is authorized to communicate with the remote destination node based on any access and/or transmission policies of the remote destination node (e.g., based on the groups of which the remote destination node is a member). If it is determined that authorization exists, the remote TM component 115 responds to the negotiation request with a reply indicating that authorization to communicate is provided. The TM component 125 associated with the participant source node receives this reply, and proceeds to allow data to be transmitted to the remote destination node (whether by transmitting the data on behalf of the participant source node, allowing a data transmission by the participant source node to proceed, etc.). If the reply instead indicates that authorization to communicate has not been obtained, the TM 125 associated with the participant source node proceeds to prevent the data transmission to the destination node from occurring (whether by dropping or otherwise discarding an intercepted data transmission, by indicating to the participant source node and/or others not to perform any data transmissions to the destination node, etc.). In addition, the TM component 125 associated with the participant source node may cache or otherwise store the result of the negotiation so that future transmissions do not require the additional step of negotiation, and the TM component 115 associated with the destination node may similarly cache or otherwise store the result of the negotiation. In this manner, Data Transmission Manager systems 102 dynamically determine whether the associated computing nodes that they manage are authorized to transmit data to various remote destination nodes.

In accordance with one embodiment, a Network Diagnostic System (NDS) 145 is also illustrated at the interconnect, in accordance with one embodiment, between the data center 100 local network and the external network 170, such as may be employed to provide a number of services (e.g., network proxies, the filtering or other management of incoming and/or outgoing data transmissions, etc.), including to analyze network communications and attempt to discover attempts at network intrusion (e.g., attempted use of a computer system that exceeds authentication limits) or attacks from some or all nodes internal to the data center 100 to nodes located in additional data centers 160 or other computing systems 180 external to the data center 100. In some embodiments, a Network Diagnostic Network System component 146 may be located on a physical machine 110*c* with one or more virtual machine nodes and/or Transmission Manager component. Further, in some embodiments, a Network Diagnostic System component 147 may be located within respective virtual machine nodes hosted on a physical machine 110*c*. The network 170 includes, for example, the Internet, intranets, extranets, wide area networks (WANs), local area networks (LANs), wired networks, wireless networks, or other suitable networks, etc., or any combination of two or more such networks.

For example, computing nodes 120, 130*a-b* on an external network, such as the Internet, often receive some form of malicious attack or attempt to compromise a security of the node 120, 130*a-b*. A majority of such attacks are not targeted and are random. With the aforementioned access policies, operators of computing nodes 120, 130*a-b* can restrict with whom the nodes communicate. However, even with the access policies, a computing node 120, 130*a-b* may be open to being attacked. For example, a computing node 120, 130*a-b* may configure its access policies to receive communications from anywhere on the external network 170, since the node 120, 130*a-b* may be offering services that are attempting to be sold to potential customers that may exist anywhere on the external network 170. Therefore, embodiments of the Network Diagnostic System 145 detect an attempt to compromise a security of computing node(s) 120, 130*a-b* by a malicious agent and cause an action to be implemented to protect computing node(s) 120, 130*a-b* which are vulnerable to actions of the malicious agent.

The example data center 100 is connected to a number of other computing systems via a network 170 (e.g., the Internet), including additional computing systems 180 that may be operated by the operator of the data center 100 or third parties, additional data centers 160 that also may be operated by the operator of the data center 100 or third parties, and an optional DTM System Manager system 150. In this example, the DTM System Manager 150 may maintain global state information for TM components in a number of data centers, such as the illustrated data center 100 and additional data centers 160. The information maintained and provided by the DTM System Manager may, for example, include group membership information, access policies, etc. Although the example DTM System Manager 150 is depicted as being external to data center 100 in this example embodiment, in other embodiments it may instead be located within data center 100.

Figure 2:
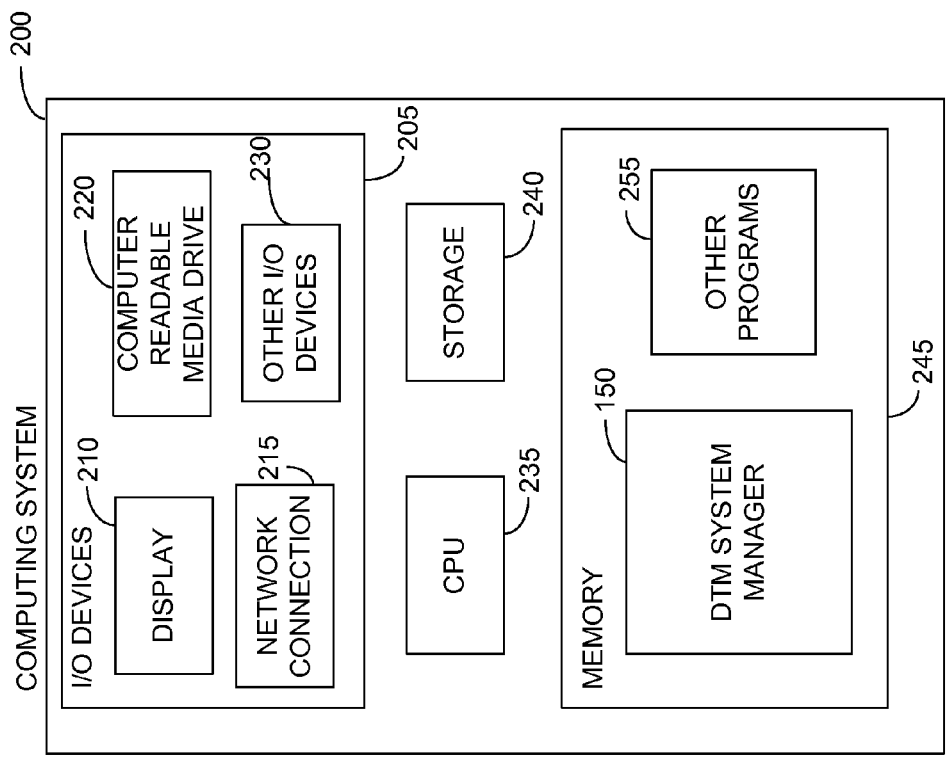
FIG. 2 is a drawing of an example computing system suitable for executing an embodiment of a DTM System Manager component of FIG. 1 according to various embodiments of the present disclosure.

FIG. 2 is a block diagram illustrating an example computing system suitable for managing communications between computing nodes, such as by executing an embodiment of a DTM System Manager component 150. In accordance with one embodiment, the example computing system 200 includes at least one central processing unit ("CPU") 235, various input/output ("I/O") devices 205, storage 240, and memory 245, with the I/O devices including a display 210, a network connection 215, a computer-readable media drive 220, and other I/O devices 230. In other embodiments, one or more components, such as display 210, may not be present in the computing system. In the illustrated embodiment, an example DTM System Manager system 150 is executing in memory 245 in order to maintain and provide information related to the operation of one or more TM components 110, 125 (FIG. 1) (such as access policies and group membership), as discussed in greater detail elsewhere.

It is understood that there may be other applications or programs 255 that are stored in the memory 245 and are executable by the central processing unit 235 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

Figure 3:
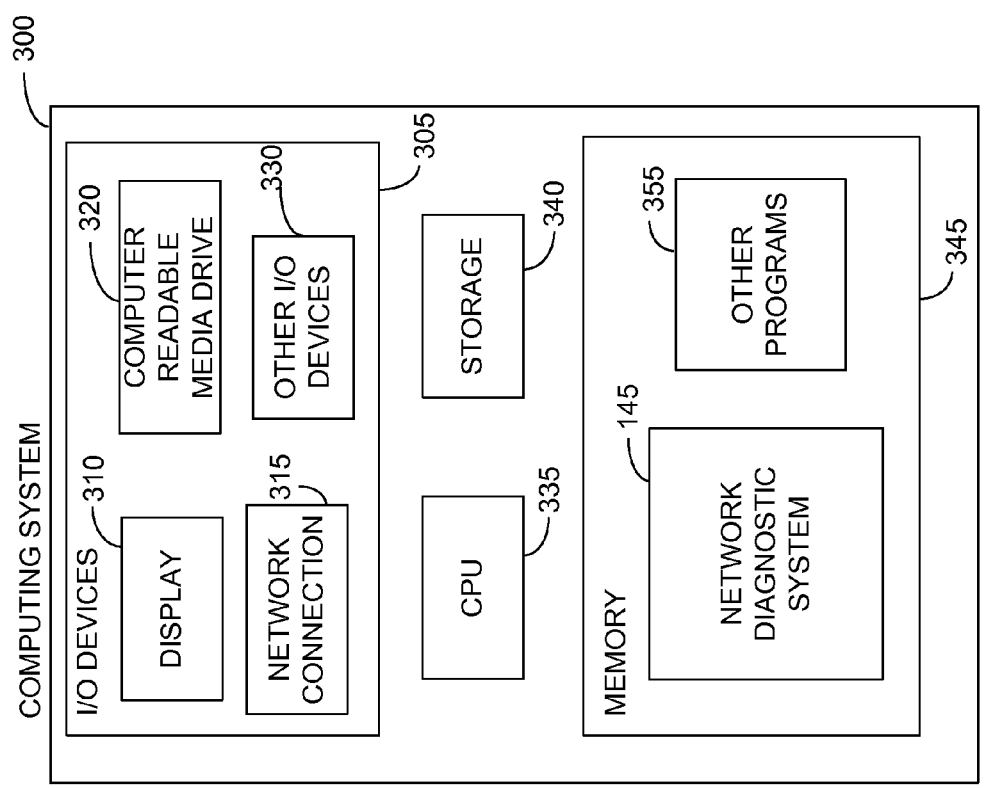
FIG. 3 is a drawing of an example computing system suitable for executing an embodiment of a Network Diagnostic System component of FIG. 1 according to various embodiments of the present disclosure.

Similarly, FIG. 3 is a block diagram illustrating an example computing system suitable for monitoring network communications between computing nodes, such as by executing an embodiment of a Network Diagnostic System component. The example computing system 300 includes at least one central processing unit ("CPU") 335, various input/output ("I/O") devices 305, storage 340, and memory 345, with the I/O devices including a display 310, a network connection 315, a computer-readable media drive 320, and other I/O devices 330. In other embodiments, one or more components, such as display 310, may not be present in the computing system. In the illustrated embodiment, an example Network Diagnostic System 145 is executing in memory 345 in order to maintain and provide information related to a status of computing nodes 120, 130*a-b* (FIG. 1), as discussed in greater detail elsewhere.

It is understood that there may be other applications or programs 355 that are stored in the memory 345 and are executable by the central processing units 335 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

It will be appreciated that computing systems 200, 300 are merely illustrative and are not intended to limit the scope of the present disclosure. For example, computing system 200, 300 may be connected to other devices that are not illustrated, including one or more networks such as the Internet or via the World Wide Web ("Web"). More generally, a "node" or other computing system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated components and systems may in some embodiments be combined in fewer components or distributed in additional components. Similarly, in some embodiments the functionality of some of the illustrated components may not be provided and/or other additional functionality may be available.

The computing device 200, 300 may comprise, for example, a server computer or any other system providing computing capability. Alternatively, a plurality of computing devices 200, 300 may be employed that are arranged, for example, in one or more server banks or computer banks or other arrangements. For example, a plurality of computing devices 200, 300 together may comprise a cloud computing resource, a grid computing resource, and/or any other distributed computing arrangement. Such computing devices 200, 300 may be located in a single installation or may be distributed among many different geographical locations. For purposes of convenience, the computing device 200, 300 is referred to herein in the singular. Even though the computing device is referred to in the singular, it is understood that a plurality of computing devices may be employed in the various arrangements as described above.

The advent of virtualization technologies for commodity hardware has provided a partial solution to the problem of managing large-scale computing resources for many customers with diverse needs, allowing various computing resources to be efficiently and securely shared between multiple customers. For example, virtualization technologies such as those provided by VMWare, XEN, or User-Mode Linux may allow a single physical computing machine to be shared among multiple users by providing each user with one or more virtual machines hosted by the single physical computing machine. Each such virtual machine may be a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

It will also be appreciated that, while various items are illustrated as being stored in memory or on storage while being used, these items or portions of them can be transferred between memory and other storage devices for purposes of memory management and data integrity. Alternatively, in other embodiments some or all of the software components and/or systems may execute in memory on another device and communicate with the illustrated computing system via inter-computer communication. Some or all of the components, systems and data structures may also be stored (e.g., as software instructions or structured data) on a computer-readable medium, such as a hard disk, a memory, a network, or a portable media article to be read by an appropriate drive or via an appropriate connection. Such computer program products may also take other forms in other embodiments. Accordingly, embodiments of the present disclosure may be practiced with other computer system configurations.

The memory 245, 345 is defined herein as including both volatile and nonvolatile memory and data storage components. Volatile components are those that do not retain data values upon loss of power. Nonvolatile components are those that retain data values upon a loss of power. Thus, the memory 245, 345 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

FIGS. 4A-4B illustrate examples of using group membership information for managing communications between computing nodes. The data illustrated in FIGS. 4A and 4B may be maintained and provided in various manners, such as by the DTM System Manager system 150 shown in FIG. 1 and/or by one or more of various TM components (e.g., in a distributed manner without use of a central system).

FIG. 4A depicts a table 400 that contains membership information for multiple node groups. In particular, each data row 404b-404f describes a membership association between a node denoted in column 402a and a group denoted in column 402b. Thus, for example, rows 404c and 404d indicate that node group Group2 includes at least nodes A and B, and rows 404e and 404f indicate that node D is a member of at least two groups. For illustrative purposes, the nodes in the present example are all indicated by single letters, such as 'A', 'B', 'C', etc., although they could instead be indicated in other ways in other embodiments, such as Internet Protocol ("IP") addresses, DNS domain names, etc. Similarly, groups are indicated in the present example by strings such as "Group1", but various other types of names may be used, and in at least some embodiments, users may be able to specify descriptive group names for groups that they use. Column 402c indicates that various types of additional information may be specified and used for groups, such as expiration dates, contact information for the user that created or otherwise manages the group, etc.

FIG. 4B depicts a table 410 that specifies access rights associated with some of the groups indicated in FIG. 4A. In particular, each data row 414b-414g indicates a named sender in column 412b that is authorized to act as a source node to transmit data to any node that is a member of the group named in column 412a. In the present example, such access rights may be specified specific to a particular transmission protocol (e.g., Remote Desktop Protocol (RDP), Secure Shell protocol (SSH), MySQL protocol, HTTP Secure (HTTPS), etc.), with three example protocols shown, those being HyperText Transfer Protocol (HTTP) 412c, File Transfer Protocol (FTP) 412d, and Simple Mail Transport Protocol (SMTP) 412e. In addition, senders may be identified in three different manners in the present example, including by IP address, by IP address range, or by group name, although other naming conventions may be employed in other embodiments (e.g., DNS domain names). For example, row 414b indicates that sending nodes that have IP addresses in the range 0.0.0.0/0 (used here to represent all hosts) may initiate communications using the HTTP protocol to nodes that are members of Group1, but that such sending nodes may not initiate communication to nodes that are members of Group1 using either the FTP or SMTP protocol. Row 414c shows that source nodes that are members of Group1 may initiate communications to nodes that are members of Group2 using the HTTP protocol, but not the FTP or SMTP protocol. Row 414d shows that source nodes that are members of Group3 may initiate communication to nodes that are members of Group2 using the HTTP or SMTP protocols, but not the FTP protocol. Row 414e shows that the single source node with the IP address 192.25.1.23 may initiate communication with member nodes of Group2 using any of the three listed protocols. Subsequent rows 414f-4146 contain descriptions of additional access policies. Column 412f indicates that additional information may be specified with respect to access policies (e.g., additional protocols, types of operations, types of data formats, policy expiration criteria such as timeouts, contact information for the user that created or otherwise manages the policy, etc.).

In the example shown in FIG. 4B, access policies may be specified on a per-transmission protocol basis. In the present example, when a source is granted access via a particular protocol, such as HTTP, this may be taken to mean that the sender may send Transmission Control Protocol ("TCP") packets to nodes in the specified group at the default port for HTTP, port 80. Other embodiments may allow access rights to be specified at other levels of details, such as to not indicate particular protocols, or to further specify particular ports for use with particular protocols. For example, some embodiments may allow access rights to more generally be specified with respect to any transmission properties of particular network transmissions, such as types of packets within particular protocols (e.g., TCP SYN packets, broadcast packets, multicast packets, TCP flags generally, etc.), connection limits (e.g., maximum number of concurrent connections permitted), packet size, packet arrival or departure time, packet time-to-live, packet payload contents (e.g., packets containing particular strings), etc. In addition, other embodiments may specify access policies in various manners. For example, some embodiments may provide for the specification of negative access policies, such as ones that specify that all nodes except for the specified senders have certain access rights. Also, different embodiments may provide varying semantics for default (unlisted) access policies. For example, some embodiments may provide a default policy that no sender may communicate with nodes of a given group unless authorized by a particular other policy, while other embodiments may provide a default policy that senders operated by a given user may by default communicate with any other nodes operated by the same user, or that nodes in a given group may by default communicate with other nodes in the same group. Finally, various embodiments may specify groups and group membership in various ways, such as by providing for hierarchies of groups or to allow for groups to be members of other groups, such that a policy would apply to any node below an indicated point in the hierarchy or to any node that is a member of a indicated group or of any sub-groups of the indicated group.

Figure 5:
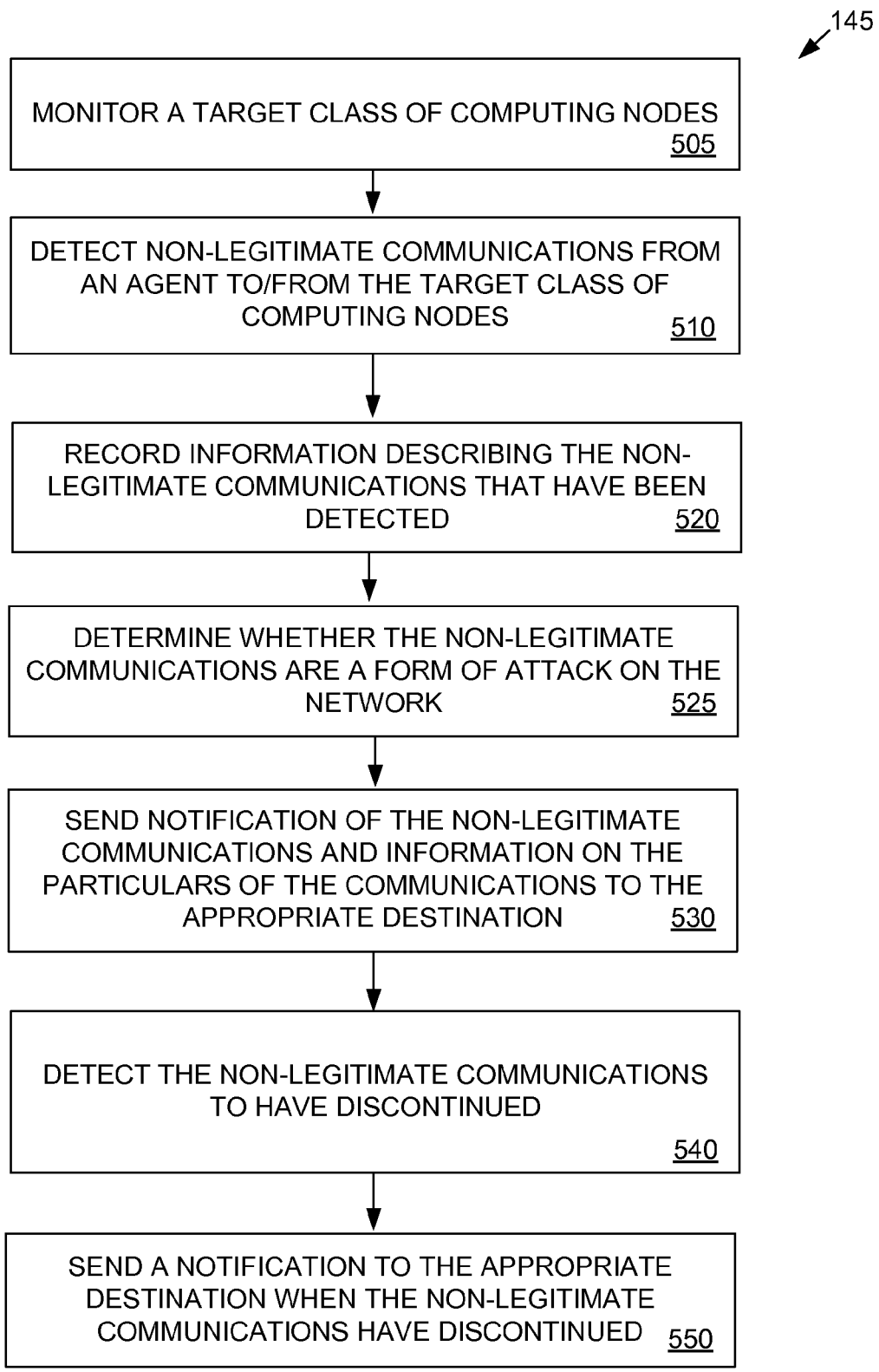
FIG. 5 is a flowchart illustrating one example of a detection routine implemented as portions of a Network Diagnostic System executed in a computing device in the Data Transmission Management System of FIG. 1 according to various embodiments of the present disclosure.

Referring next to FIG. 5, shown is a flowchart that provides one example of the operation of a portion of the Network Diagnostic System 145 according to various embodiments. It is understood that the flowchart of FIG. 5 provides merely an example of the many different types of functional arrangements that may be employed to implement the operation of the portion of the Network Diagnostic System 145 as described herein. As an alternative, the flowchart of FIG. 5 may be viewed as depicting an example of steps of a method implemented in the computing device 300 (FIG. 3) according to one or more embodiments.

In box 505, one exemplary detection routine includes the Network Diagnostic System 145 monitoring a target class of computing nodes. For example, in one embodiment, the target class may include an address-space of computing nodes that have not been used to legitimately communicate with or receive communications from other computing nodes. The address-space may have been set aside for monitoring purposes and is not intended for actual use. Accordingly, there is no legitimate reason for another computing node to attempt communications with a node in this "dark" address space. As such, any traffic monitored by the Network Diagnostic System 145 to this class of targets is likely a form of port scanning attack or other suspicious activity, as previously mentioned.

Beyond monitoring unused computing nodes and node addresses, a second implementation involves monitoring computing nodes and node addresses that are not currently allocated to customers but are intended to be used by future customers. For example, in a public data center operated by entities as businesses that provide access to computing resources to customers, there is a churn in customer use of the available node addresses. At any particular time, some node addresses (e.g., IP addresses) are going to be in use and some are not, where the ones that are not in current use have been used in the past by past customers. Accordingly, in this particular implementation, the target class of computing nodes includes computing nodes that are not currently allocated to customers. Unlike a situation where the set of computing nodes have gone unused, any communications or traffic to a computing node within this address-space can not be assumed to be suspicious, since a received communication may have been the result of previous relationship with a customer or user who used to but no longer uses the computing node. Therefore, an aggregate of detected activities of a suspected malicious agent may be considered before determining the agent or source to be malicious. Accordingly, if the same traffic or communication is detected from the agent to a particular number (e.g., 12) unallocated node addresses, then the activity may be determined to exceed a set threshold (e.g., 11) which may be a determinative factor in categorizing the communication as a network attack. In other words, an instance of network communications is correlated by the Network Diagnostic System 145 with other instances and recognized to be a pattern of activity by a malicious agent.

A third possible implementation in monitoring for network attacks is to monitor dropped communications and traffic from allocated computing nodes. As discussed above, customers using the computing nodes define and specify groups of one or more source nodes that are authorized to communicate with groups of one or more destination nodes, such as when a source node and destination node both belong to a common group of nodes, as illustrated in FIG. 4. Unauthorized communications to a computing node are dropped or discarded by the data transmission manager associated with the computing node. In this implementation, a target class of computing nodes includes allocated computing nodes with dropped communications by the Network Diagnostic System 145.

For example, one customer may have an access policy that disallows any SSH traffic or only allows SSH traffic from a specific IP address (or range). Upon monitoring the customer's dropped communications, one may find that a single IP address 1.2.3.4 tried to connect with the customer using SSH. Further, after monitoring other allocated customers' dropped communications, IP address 1.2.3.4 is noted to have tried to connect with 100 other customers who do not permit SSH communications. Accordingly, the node at address 1.2.3.4 appears to be scanning the SSH ports of computing nodes.

While a small number of received communications from IP address 1.2.3.4 using SSH to nodes that have blocked SSH communications may be legitimate, an aggregate of dropped communications from one nodes to a particular number (e.g., 100) of allocated nodes who have blocked this type of communication may be determinative factor in categorizing the communication as a network attack. In other words, a pattern of activity by the malicious agent is monitored and detected. Further, in some embodiments, multiple sources of non-legitimate traffic may be determined by the Network Diagnostic System 145 to be related and therefore may be treated as belonging to one source node. For example, the multiple sources may share a common feature or trait.

In some embodiment, the Network Diagnostic System 145 interprets information gathered and observed to determine if network usage is normal or abnormal. Accordingly, the Network Diagnostic System 145 may monitor network behavior to determine what normal usage appears as and to be used as a baseline for which to compare suspected behavior. In other embodiments, Network Diagnostic System 145 may utilize known or predefined patterns of activity patterns and behavior that have been previously identified as suspicious or malicious to compare with monitored activity. Further, in some embodiments, the Network Diagnostic System 145 utilizes a heuristic approach and learns over time what types of traffic patterns are considered normal for a network and then watches for anomalies in the traffic pattern. The methodology used by the Network Diagnostic System accordingly may be adapted over time as network patterns change.

In box 510, the Network Diagnostic System 145 detects suspicious or non-legitimate communications from an agent or source to/from the target class of computing nodes, as discussed above, and in box 520, records information describing the suspicious or non-legitimate communications from the agent that have been detected. As discussed above, depending upon the target class of nodes being used, an aggregate number of incidents of non-legitimate communications meeting a threshold value may have to be observed before a determination (525) is made to categorize communications from the agent as suspicious or as a possible network attack. The threshold value may be predefined or may be the result of heuristic computations that take into account different network attributes or characteristics (e.g., a type of transmission protocol used in a communication).

In box 530, a notification of the suspicious or non-legitimate communications and information on the particulars of the communications is sent to the appropriate destination (e.g., DTM System Manager). A notification may further be sent to the appropriate destination (e.g., DTM System Manager) when the agent is observed or detected to have stopped or discontinued communications to/from the target class in boxes 540-550.

After detection of activities of a malicious agent on a network 170 with regard to a subset of computing nodes on the network, security protections then may be dynamically implemented for remaining computing nodes on the network before these computing nodes encounter communications from the malicious agent. For example, a malicious agent may be in the process of scanning for vulnerabilities within a plurality of computing nodes and its activities may be detected after scanning one or more nodes by the Network Diagnostic System. Upon recognizing the malicious nature of the communications from the agent, new security measures may be implemented (while the agent is still in the process of scanning) for the plurality of computing nodes protecting against communications from the agent or against communication of the type being used by the agent (e.g., an attack via RDP protocol), while the network attack is still in progress by the malicious agent. In one embodiment, the new security measures that were implemented (by DTM System Manager 150) may be dynamically removed after the threat of the network attack from the agent is gone or dissipated (e.g., the agent has discontinued communications). Therefore, consider an agent or source that is scanning a fleet of 1000 computers. The agent scans computer 1 and computer 2. By the time the agent attempts communications with computer 3, every computer in the fleet has been protected from communications with the agent, while the network attack continues. In one embodiment, the set of computing nodes that is to be protected from a network attack is a superset of the target class of computing nodes. In other embodiments, the set of computing nodes to be protected are not a superset but may overlap with the target class of computing nodes.

Figure 6:
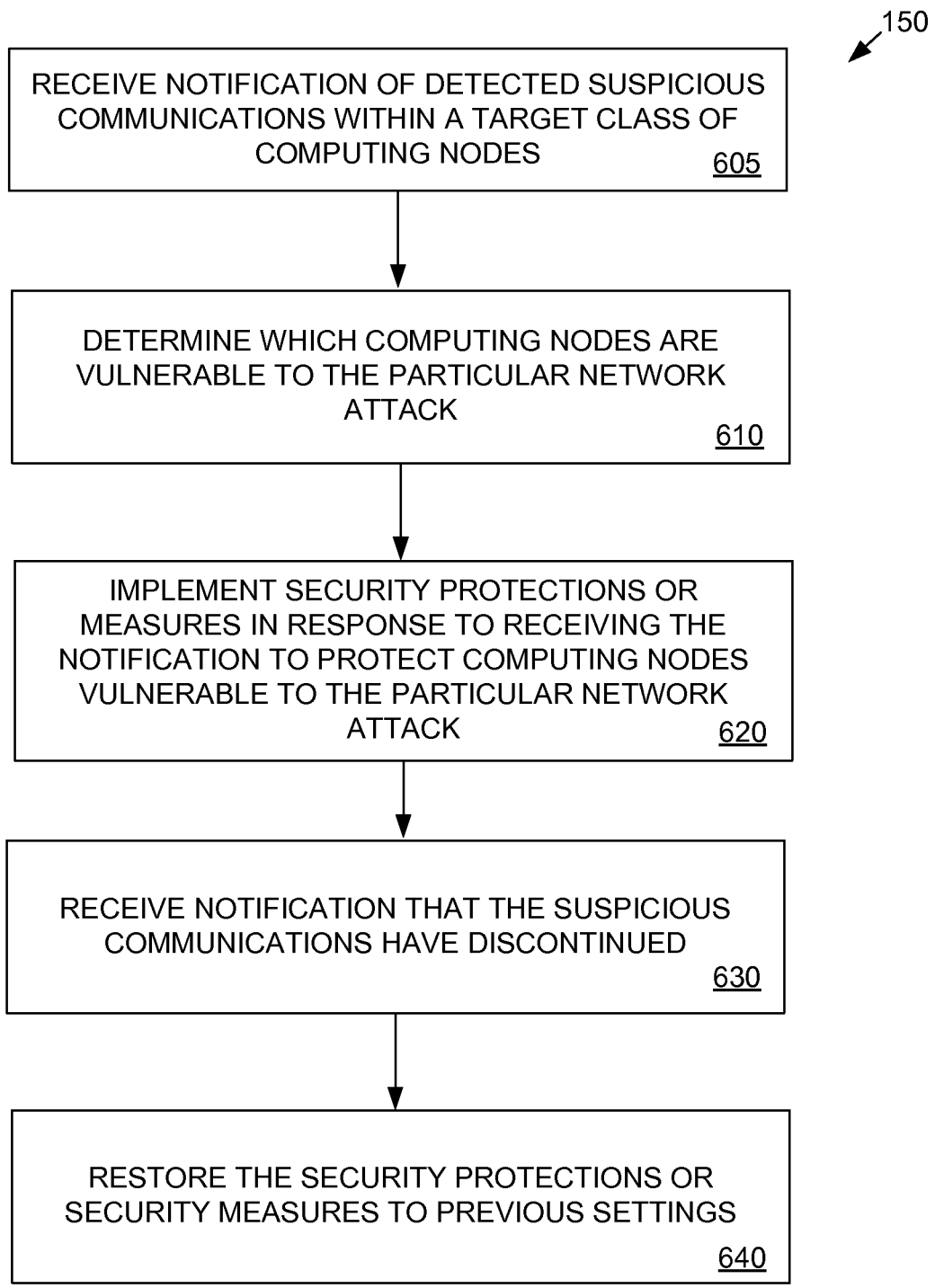
FIG. 6 is a flowchart illustrating one example of a response routine implemented as portions of a Network Diagnostic System executed in a computing device in the Data Transmission Management System of FIG. 1 according to various embodiments of the present disclosure.

Referring next to FIG. 6, shown is a flowchart that provides one example of the operation of a portion of the DTM System Manager System 150 according to various embodiments. It is understood that the flowchart of FIG. 6 provides merely an example of the many different types of functional arrangements that may be employed to implement the operation of the portion of the DTM System Manager System 150 as described herein. As an alternative, the flowchart of FIG. 6 may be viewed as depicting an example of steps of a method implemented in the computing device 200 (FIG. 2) according to one or more embodiments.

In box 605, an exemplary response routine includes the DTM System Manager 150 receiving notification of detected non-legitimate or suspicious communications within a target class of computing nodes. The notification may identify the source of the communications (e.g., IP address), intended destination of the communications (e.g., IP address), a categorization of the type of the network attack, the form of communication being used (e.g., communications using RDP protocol), etc. In box 610, the DTM System Manager 150 determines which computing nodes are vulnerable to the particular network attacks and in box 620, the DTM System Manager 150 implements security protections or measures in response to receiving the notification to protect computing nodes vulnerable to the particular network attack.

In one embodiment, access protocols of customers may be enhanced to cover being protected from the particular network attack. For example, a customer may have specified access rights for a group indicating that all computing nodes may act as a source node and transmit to any member of the group using RDP protocol. This set of access rights will not protect the group from the network attack described above from a malicious agent using the RDP protocol. Therefore, the DTM system manager 150 may determine the node of the customer to be vulnerable to an attack and dynamically update the customer's access rights to be protected against a network attack. Accordingly, the rights may be changed to disallow communications from the malicious agent or source or to prohibit communications under the RDP protocol, as possible examples. Accordingly, the tables previously discussed with regard to FIG. 4 may be changed to reflect new settings to protect computer node(s) against a detected network attack. Accordingly, a specific exception to a customer's defined access rights may be implemented to protect the customer from the detected network attack, such as blocking access to a specific port from a specific IP address or address range. After notification is received that the detected network attack has gone or been dissipated, the DTM System Manager 150 changes or restores the security measures back to the settings previously specified by the customer, in boxes 630-640.

In one embodiment, an option is provided to a customer to allow for or authorize dynamic changes to be made to the customer's access rights when a new network attack is discovered for which a node of the customer is vulnerable. FIG. 7A depicts a table 700 that contains option information for multiple nodes regarding whether to accept a form of protection against a network attack. In this particular implementation, authorization may be provided as to whether dynamic changes may be implemented to access rights for a particular node. Each data row 706b-706d describes a relationship between a node denoted in column 702 and a protection option denoted in column 704. If an operator/customer associated with a node chooses to allow for dynamic changes to the access rights associated with the node to be made, then the protection option denoted in column 704 is marked as "YES". Otherwise, the protection option denoted in column 704 is marked as "NO". Thus, for example, rows 706b and 706c indicate that nodes A and B are authorized to receive protection in the form of dynamic changes being made to their associated access rights. Row 706c indicates that node C is not authorized to receive such protection. Therefore, if the customer has not provided authorization, then the customer's or user's access rights will not be changed in accordance with the above-described methods. Accordingly, options 704 may be verified before access rights and security measures defined by a customer or user are changed, in one embodiment.

Customers/users may want to base choosing whether or not to authorize dynamic changes to its access rights after weighing the risks versus the rewards of such changes. For example, the risk of blocking legitimate communications from a prospective client or consumer/customer may outweigh the risk of being subject to a network attack. In some embodiments, the option to authorize dynamic changes to access rights may be provided granularly, such as in regard to certain ports, and therefore, may be authorized for some ports and not others.

FIG. 7B depicts a table 710 that specifies access policies on a per-transmission protocol basis, as earlier discussed with regard to FIG. 4B. In table 710, for different groups indicated in column 712, access rights are specified specific to particular transmission protocol to indicate whether communications may be received and transmitted on a port associated with the particular transmission protocol, with three example protocols shown, those being HTTP 714a, FTP 716a, and RDP 718a. Columns 714b, 716b, 718b indicate whether protections are authorized to be implemented to protect the authorized transmission protocols 714a, 716a, 718a in the table, in accordance with embodiments of the present disclosure. Thus, for example, row 720b indicates that nodes having access policies defined by Group1 are authorized to utilize HTTP protocols and are not authorized to utilize FTP and RDP protocols. For the authorized HTTP protocol, protections have not been authorized to dynamically change the access rights associated with the HTTP protocols and associated port(s) to protect against a network attack. Since the FTP and RDP protocols are not authorized and the communications on these ports have been blocked/disallowed in accordance with access policies defined by a customer/user, the content of fields of columns 716b and 718b do not need to be considered and are not subject to being dynamically changed.

Next, row 720c indicates that nodes having access policies defined by Group2 are authorized to utilize HTTP and RDP protocols and are not authorized to utilize FTP protocols. For the authorized HTTP protocol, protections have been authorized to dynamically change the access rights associated with the HTTP protocols and associated port(s) to protect against a network attack. In contrast, for the authorized RDP protocol, protections have been authorized to dynamically change the access rights associated with the RDP protocols and associated port(s) to protect against a network attack. Since the FTP protocols are not authorized and the communications on these ports have been blocked/disallowed, the content of the field of column 716b does not need to be considered and is not subject to being dynamically changed. In one embodiment, the tables of FIG. 7 may be reviewed to verify whether a customer/user has authorized dynamic changes to be made to associated access rights in response to a network attack.

One embodiment restores security measures to an earlier state before changes were made as earlier discussed with regards to box 640 of FIG. 6. For example, a customer's or user's access rights may be modified to disallow communications on a data transmission port (via a data transmission protocol) where the customer's access rights specify that such communication is allowed. Accordingly, after a network attack is determined to have stopped, the customer's access rights may be changed back to allow for communications on the data transmission port (via the data transmission protocol).

In other embodiments, the access rights may be changed for a defined period of time and after the defined period of time expires, then the access rights are restored. Therefore, in this type of embodiment, stoppage of the network attack or of the suspicious or non-legitimate communications does not need to be detected and relayed to the DTM system manager 150.

Additional responses to a detected network attack may also be executed in various embodiments. Possible responses include collecting information on the suspicious communications, such as when, where, which, and how many episodes or incidents have been attempted by the source of the communications, changing access rights, spoofing replies to the source, providing reports to an owner of the source and/or to owner(s) of nodes that have been attacked, publish an identity of the source to community blacklists accessible from external network 170, and taking a counteraction against the source to attempt to disable the source. Further, responses could include sending notifications to system administrators and logging the communication activity of the source as an audit trail to provide evidence for post-attack analysis. If a source is determined to be a customer of the data center hosting the Network Diagnostic System 145 and DTM System Manager 150 applications, the DTM System Manager may automatically start a mitigation procedure against the source by blocking outgoing traffic and start internal investigations of fraud and abuse.

Various embodiments may provide mechanisms for customer users and other users to interact with an embodiment of the DTM system 102. For example, some embodiments may provide an interactive console (e.g. a client application program providing an interactive user interface, a Web browser-based interface, etc.) from which users can manage the creation or deletion of groups and the specification of communication access policies or group membership, as well as more general administrative functions related to the operation and management of hosted applications (e.g., the creation or modification of user accounts; the provision of new applications; the initiation, termination, or monitoring of hosted applications; the assignment of applications to groups; the creation of access rights for groups, the authorization of implementing dynamic changes to the access rights, the reservation of time or other system resources; etc.). In addition, some embodiments may provide an API ("application programming interface") that allows other computing systems and programs to programmatically invoke such functionality. Such APIs may be provided by libraries or class interfaces (e.g., to be invoked by programs written in C, C++, or Java) and/or network service protocols such as via Web services.

In addition, various implementation architectures are possible for embodiments of the DTM system 102. In some embodiments, multiple Network Diagnostic System and DTM System Manager components may act in a distributed manner to each monitor and manage the data transmissions of one or more associated nodes, whether by each operating as an independent autonomous program or by cooperating with other Network Diagnostic System and DTM System Manager components, and may possibly be hosted virtual machines on the same computing system as the nodes being managed or may instead operate on computing systems remote from the nodes that they manage. In still other embodiments, the functionality of a Network Diagnostic System component 145 may be distributed, such as by being incorporated into each of the computing nodes being monitored, or a distinct DTM System Manager component 150 may operate on behalf of each computing node. In one embodiment, a Network Diagnostic System component may be installed in an unallocated computing node within a data center environment that is removed once the node is allocated to a customer. In another embodiment, a Network Diagnostic System component may be installed as a part of each computing node, whether allocated or unallocated.

In other embodiments, a single, central DTM System Manager component, Network Diagnostic System component, or other component may manage the received notifications from Network Diagnostic System components and implementing security measures in response to these notifications for a large number of computing nodes (e.g. an entire data center). Further, a single or a small number of, central DTM System Manager components or other components may monitor network traffic at an edge of the data center at an interconnect with the external network 170 or other network choke point.

As previously noted, the described techniques may be employed on behalf of numerous computing nodes to provide various benefits to those computing nodes. In addition, such computing nodes may in at least some embodiments further employ additional techniques on their own behalf to provide other capabilities, such as by each configuring and providing their own firewalls for incoming communications, anti-virus protection and protection against other malware, etc.

When the described techniques are used with a group of computing nodes internal to some defined boundary (e.g., nodes within a data center), such as due to an ability to obtain access to the data transmissions initiated by those computing nodes, the described techniques may also in some embodiments be extended to the edge of the defined boundary. Thus, in addition to monitoring data transmissions between computing nodes within the defined boundary, one or more Network Diagnostic System components that may access and monitor communications passing through the boundary between internal and external computing nodes may similarly provide at least some of the described techniques for those communications. For example, when a data communication is received at the boundary from an external computing node that is intended for an internal computing node, a Network Diagnostic System 145 component associated with the edge may similarly monitor communications at the edge for network attacks and communicate with a DTM System manager 150 as network attacks are detected. Possible network attacks and traffic patterns that represent hostile actions or misuse include, but are not limited to, denial of service attacks, man in the middle attacks, IP spoofing, port scanning, packet sniffing, worms, backscatter, malicious content in data payloads, trojans, viruses, tunneling, brute-force attacks, etc.

In one implementation, traffic intended for unallocated computing hosts may be identified and routed to a specific computing host hosting the Network Diagnostic System 145. With communications to unallocated computing hosts, privacy concerns in reviewing contents of the communications are minor or non-existence, since the communications are not legitimate. Identification of the traffic may occur at the edge of the network.

For example, IP addresses of sources and destinations can be monitored and for destinations that are determined to be unallocated or unused, the communications may be routed to the Network Diagnostic System 145. Further, in some embodiments, the Network Diagnostic System 145 may be located at the edge and track the IP addresses of sources that are repeatedly attempting to communicate using blocked protocols to destination hosts. Such tracking may be implementing by network hardware at the edge, in addition to network software. This type of monitoring would not violate a customer's privacy since the contents of the communications is not being monitored.

In one embodiment, the Network Diagnostic System 145 communicates with the data transmission managers associated with the allocated computing hosts to receive dropped communications or to review logs from the data transmission managers describing the dropped communications.

Those skilled in the art will also realize that although in some embodiments the described techniques are employed in the context of a data center housing multiple intercommunicating nodes, other implementation scenarios are also possible. For example, the described techniques may be employed in the context an organization-wide intranet operated by a business or other institution (e.g. university) for the benefit of its employees and/or members. Alternatively, the described techniques could be employed by a network service provider to improve network security, availability, and isolation. In addition, example embodiments may be employed within a data center or other context for a variety of purposes. For example, data center operators or users that sell access to hosted applications to customers may in some embodiments use the described techniques to provide network isolation between their customers' applications and data; software development teams may in some embodiments use the described techniques to provide network isolation between various environments that they use (e.g., development, build, test, deployment, production, etc.); organizations may in some embodiments use the described techniques to isolate the computing resources utilized by one personnel group or department (e.g., human resources) from the computing resources utilized by another personnel group or department (e.g., accounting); or data center operators or users that are deploying a multi-component application (e.g., a multi-tiered business application) may in some embodiments use the described techniques to provide functional decomposition and/or isolation for the various component types (e.g., Web front-ends, database servers, business rules engines, etc.). More generally, the described techniques may be used to partition virtual machines to reflect almost any situation that would conventionally necessitate physical partitioning of distinct computing systems.

Although Network Diagnostic System 145 and DTM System Manger 155, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flow charts of FIGS. 5 and 6 show the functionality and operation of an implementation of portions of the Network Diagnostic System 145 and DTM System Manger 155. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor or CPU 335, 435 in a computer system or other system. The machine code may be converted from the source code, etc. If embodied in hardware, each block may represent a circuit or a number of interconnected circuits to implement the specified logical function(s).

Although the flow charts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. Further, in some embodiments, one or more of the blocks shown in FIGS. 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including Network Diagnostic System 145 and DTM System Manger 155, that comprises software or code can be embodied in any non-transitory computer-readable medium for use by or in connection with an instruction execution system such as, for example, a processor or CPU 335, 435 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium storing specific instructions that, when executed, cause at least one computing device to at least:
   monitor data communications transmitted to a target class of first computing nodes,
   wherein the target class of first computing nodes comprises computing nodes that are allocated to users and have dropped data communications associated with a particular data transmission port that is blocked by the first computing nodes;
   in response to detecting a dropped data communication to a computing node in the target class associated with the particular data transmission port, determine whether the dropped data communication is a form of attack on a network to which the computing nodes are connected by tracking a number of attempted data communications from a source of the dropped data communication against computing nodes in the target class of first computing nodes and comparing the number against a threshold value;
   in response to determining that the network is under attack, implement new security measures for second computing nodes that are not part of the target class and allow for communications associated with the particular data transmission port to protect the second computing nodes against the attack on the network while the attack is ongoing, wherein the new security measures are implemented by generating a list of one or more internet protocol addresses associated with one or more sources of the dropped data communications and sending the list of one or more internet protocol addresses to at least one transmission manager for the second computing nodes, wherein the at least one transmission manager is configured to drop a communication from an internet protocol address and to the particular data transmission port contained on the list that is sent to one or more of the second computing nodes; and
   receive authorization from one or more users of the second computing nodes before making changes to access policies of the second computing nodes.

2. The computer-readable medium of claim 1, wherein the specific instructions, when executed, further cause the at least one computing device to at least restore the security measures to a previous state before the security measures were changed after determining that the attack to the network has stopped.

3. The computer-readable medium of claim 1, wherein the authorization is specified for the particular data transmission port and the authorization is verified before access rights for the particular data transmission port can be changed.

4. A system, comprising:
   at least one computing device; and
   a data transmission system manager executable in the at least one computing device, the data transmission system manager configured to:
      receive notification of a detected activity involving dropped data communications to a target class of first computing nodes, wherein the dropped data communications are generated by intercepting and discarding data communications from a source node after determining that the source node of the data communications is not associated with user-defined groups of computing nodes that are pre-authorized to communicate with the target class of first computing nodes over a particular data transmission port;
      wherein the target class of first computing nodes comprises computing nodes that are allocated to users and have dropped data communications directed to the particular data transmission port;
      in response to receiving the notification, determine which computing nodes are vulnerable to the detected activity, wherein the vulnerable computing nodes are not restricted to the target class and are authorized to communicate over the particular data transmission port;
      change security measures of the vulnerable computing nodes to protect against the detected activity by generating a list of one or more internet protocol addresses associated with one or more sources of the dropped data communications and sending the list of one or more internet protocol addresses to at least one transmission manager for the vulnerable computing nodes, wherein the at least one transmission manager is configured to drop a communication from an internet protocol address and to the particular data transmission port contained on the list that is sent to one or more of the vulnerable computing nodes; and restore the security measures to a previous state before the security measures were changed after the detected activity has stopped.

5. The system of claim 4, wherein the data transmission system manager is operable to drop a data communication for one computing node of the target class of first computing nodes when the data communication is directed to a network port of the one computing node that is restricted for receiving incoming data communications over the network port.

6. The system of claim 4, wherein the data transmission system manager is operable to monitor the dropped data communications of the target class of first computing nodes and identify the source node as originating a number of dropped data communications which exceeds a defined threshold.

7. The system of claim 4, wherein the data transmission system manager is operable to monitor the dropped data communications of the target class of first computing nodes and identify the source node as originating dropped data communications to a number of the first computing nodes which exceeds a defined threshold.

8. The system of claim 4, wherein the security measures are changed while the detected activity is ongoing.

9. The system of claim 4, wherein the data transmission system manager is further configured to verify authorization from a user of a particular computing node that is vulnerable to the detected activity before making changes to the security measures of the particular computing node.

10. The system of claim 9, wherein the authorization is specified for the particular data transmission port and the authorization is verified before access rights for the particular data transmission port can be changed.

11. The system of claim 4, wherein the data transmission system manager is further configured to:
monitor data communications transmitted to the target class of first computing nodes; and
in response to detecting a dropped data communication to a computing node in the target class, determine whether the dropped data communication is a form of attack on a network to which the computing node is connected.

12. A method, comprising:
monitoring data communications transmitted to a target class of first computing nodes,
wherein the target class of first computing nodes comprises computing nodes that are allocated to users and have dropped data communications associated with a particular data transmission port;
determining that a source node of the monitored data communications is not associated with user-defined groups of source nodes that are pre-authorized to communicate with the target class of first computing nodes over the particular data transmission port;
generating dropped data communications by intercepting and discarding the monitored data communications from the source node that are addressed for the target class of first computing nodes and are associated with the particular data transmission port;
in response to detecting a dropped data communication addressed to a computing node in the target class over the particular data transmission port, determining whether the dropped data communication is a form of attack on a network to which the first computing nodes are connected; and
in response to determining that the network is under attack, implementing new security measures for second computing nodes that are not part of the target class to protect the second computing nodes against the attack on the network while the attack is ongoing, wherein the new security measures implemented by generating a list of one or more internet protocol addresses associated with one or more sources of the dropped data communications and sending the list of one or more internet protocol addresses to at least one transmission manager for the second computing nodes, wherein the at least one transmission manager is configured to drop a communication from an internet protocol address and to the particular data transmission port contained on the list that is sent to one or more of the second computing nodes.

13. The method of claim 12, further comprising dropping the data communication for one computing node of the target class of first computing nodes when the data communication is directed to a network port of the one computing node that is restricted for receiving incoming data communications associated with the network port.

14. The method of claim 12, wherein the network is determined to be under attack by tracking a number of attempted data communications from the source node of the dropped data communication to computing nodes in the target class and comparing the number against a threshold value.

15. The method of claim 12, wherein the attack on the network is identified by determining the source node of the dropped data communications to have transmitted data communications which were dropped and addressed for a number of the first computing nodes which exceeds a defined threshold.

16. The method of claim 12, wherein the new security measures comprise changing access policies of the second computing nodes to avoid the attack on the network while the attack is ongoing.

17. The method of claim 16, further comprising verifying authorization from one or more users of the second computing nodes before making changes to the access policies of the second computing nodes.

18. The method of claim 17, wherein the authorization is specified for the particular data transmission port and the authorization is verified before access rights for the particular data transmission port can be changed.

* * * * *